United States Patent [19]

Caesar

[11] Patent Number: 5,333,194
[45] Date of Patent: Jul. 26, 1994

[54] AUTOEQUALIZING BIDIRECTIONAL-TO-UNIDIRECTIONAL HYBRID NETWORK

[75] Inventor: David D. Caesar, North Vancouver, Canada

[73] Assignee: Glenayre Electronics, Inc., Charlotte, N.C.

[21] Appl. No.: 598,244

[22] Filed: Oct. 15, 1990

[51] Int. Cl.$^5$ ............................................. H04B 1/52
[52] U.S. Cl. ........................... 379/402; 379/400; 379/403; 379/404; 379/408; 379/343
[58] Field of Search ............... 379/399, 400, 402, 403, 379/404, 406, 408, 338, 340, 343, 344, 345, 391, 6

[56] References Cited

U.S. PATENT DOCUMENTS

| | | | |
|---|---|---|---|
| 3,178,521 | 4/1965 | Brown | 179/170 |
| 3,500,000 | 3/1970 | Kelly, Jr. et al. | 179/172 |
| 3,508,017 | 4/1970 | Unrue, Jr. | 179/170.2 |
| 3,790,723 | 2/1974 | Stewart | 379/402 X |
| 3,892,924 | 7/1975 | Vachon | 179/15 |
| 3,944,743 | 3/1976 | Criglar et al. | 179/1 |
| 3,982,080 | 9/1976 | Ukeiley | 379/403 |
| 4,096,361 | 6/1978 | Crawford | 379/403 |
| 4,096,362 | 6/1978 | Crawford | 379/403 |
| 4,275,276 | 6/1981 | Rizzo | 179/170 D |
| 4,276,450 | 6/1981 | Chowaniec | 379/404 X |
| 4,284,859 | 8/1981 | Araseki | 179/170 NC |
| 4,365,119 | 12/1982 | Chung et al. | 179/170.2 |
| 4,368,361 | 1/1983 | Chung et al. | 179/172 |
| 4,368,362 | 1/1983 | Chung et al. | 179/170.2 |
| 4,577,071 | 3/1986 | Johnston et al. | 179/172 |
| 4,641,339 | 2/1987 | Stottlemyer | 379/391 |
| 4,669,115 | 5/1987 | Messerschmitt | 379/402 |
| 4,747,132 | 5/1988 | Ibaraki et al. | 379/390 |
| 4,845,746 | 7/1989 | Li | 379/411 |
| 5,133,007 | 7/1992 | Nishimura | 379/402 X |

Primary Examiner—James L. Dwyer
Assistant Examiner—M. Shehata
Attorney, Agent, or Firm—Christensen, O'Connor, Johnson & Kindness

[57] ABSTRACT

An autoequalizing hybrid circuit for providing a cancelation path to minimize the two-wire receive path signals that are reflected onto a two-wire transmit path from a subscriber line interface circuit is disclosed. The hybrid circuit includes a variable impedance balance network. A tone generator injects a set of equalization signals into the receive path which are used to control the setting, or equalization, of the balance network. The tone generator also generates a supervisory signal into the receive path used to monitor the performance of the balance network. A detect circuit monitors the level of the reflected equalization sidetone signals and produces balance signals whenever the equalization signals fall to a null level. The detect circuit also monitors the supervisory sidetone signals and produces a recalibration signal whenever an abrupt change in the signals indicates that the balance network is no longer adequately cancelling their reflected signals. A microprocessor controls the generation of the equalization and supervisory signals and is connected to the detect circuit for monitoring production of the balance and the recalibration signals. When the hybrid is first activated, the microprocessor initially sets the balance network impedance with reference to the balance signals. After the balance network is equalized the microprocessor directs the tone generator to produce the supervisory sidetone signals. The microprocessor then monitors the detect circuit for recalibration signals and if they are produced, reequalizes the impedance of the balance network.

41 Claims, 4 Drawing Sheets

AUTOEQUALIZING BIDIRECTIONAL-TO-UNIDIRECTIONAL HYBRID NETWORK

FIELD OF THE INVENTION

This invention relates generally to two-to-four wire hybrid circuits and, more particularly, to an autoequalizing hybrid that maximizes the signal separation between receive and transmit signal paths.

BACKGROUND OF THE INVENTION

Audio hybrids are devices which are used in telecommunications systems to convert bidirectional signals which travel over two-wire signal paths to a pair of unidirectional signals for transmission over four-wire signal paths. A common application for an audio hybrid is to function as a two-to-four wire interface between a telecommunications terminal device and transmission equipment to which it is connected. This is because terminal devices, for example telephones, facsimile machines, and computer modems, typically have two-wire conductive paths overwhich signals travel in both directions simultaneously. The associated transmission equipment, which is used to exchange signals with other terminal devices, has separate elements for processing the signals that are transmitted from and received by the terminal device. Associated with each set of unidirectional processing elements is a two-wire unidirectional signal path. Most transmission equipment thus includes two two-wire conductive paths, a four-wire conductive path, over which signals travel to and from the separate processing elements. The audio hybrid converts the two-wire bidirectional signals from the terminal device into four-wire unidirectional signals that can be applied to the telecommunications equipment.

One type of audio hybrid is the subscriber line interface circuit, or SLIC. The SLIC comprises a set of current mirrors that convert differential signals that are transmitted across the two-wire conductive path into single-ended, or ground referenced, signals for the output on the transmit path portion of the four-wire conductive path. The SLIC also simultaneously converts input signals from the receive path portion of the four-wire conductive path into differential signals for output on the two-wire conductive path. SLICs are frequently fabricated as single integrated circuit components. One such SLIC is the Bipolar Integrated Circuit SLIC Part No. MC-3419 manufactured by the Motorola Corporation. U.S. Pat. No. 4,004,109, incorporated herein by reference, discusses how a SLIC can be assembled out of a set of current mirrors.

While SLICs are useful for separating bidirectional signals into unidirectional signals, they do not work alone, Inherent impedances of the SLIC and the terminal device to which it is attached cause a portion of the signal received by the SLIC to be reflected and retransmitted as part of the signal transmitted out of the SLIC. The reflected signal, referred to as sidetone signal, can significantly distort the desired transmitted signal. For example, during a telephone conversion a reflected sidetone signal can be heard as a "singing" high-frequency signal. Sometimes the singing signal can rise to sufficient magnitude to drown out the audio signal the listener is supposed to hear.

Consequently, it is necessary to provide an impedance path, referred to as a balance network, across the separate receive/transmit signal lines connected to most SLICs. The balance network applies a portion of the signal transmitted into or received by the SLIC, to the transmit signal generated by the SLIC. This signal, called a balancing signal, cancels the reflected sidetone component of the signal transmitted by the SLIC so that final signal is free of the sidetone signal. The magnitude of the balancing signal applied to the transmit path is controlled by the impedance of the balance network.

A disadvantage of many balance networks is that their impedances are difficult to adjust. Many balance networks are constructed so that their impedances are set at the time of manufacture. This works satisfactorily when the impedance of the associated SLIC and terminal device are also known and similarly unchanging; an appropriate balancing signal will always be applied on the transmit lines extending from the SLIC. However, if a new terminal device with a different internal impedance is connect to the SLIC, the balance network may not apply a balancing signal of appropriate level to cancel out the reflected sidetone. This can cause a sidetone signal to be emitted over the transmit side of the four-wire path connected to the SLIC.

Some balance networks have been constructed that initially automatically set the appropriate impedance level. This makes it possible to attach terminal devices with different impedances to the same SLIC. Each time the terminal device is activated, the balance network automatically sets the impedance to the appropriate value so that the necessary balancing signal is applied to the transmit wires from the SLIC. Nevertheless, these networks do not adjust for changes in terminal device impedance while the SLIC is in use. This can happen, for example, when the SLIC is connected to a number of telephones and the users pick up one telephone and put down another telephone. If the telephones have different impedances, the previously-set balance network may no longer apply the appropriate balance signal. Moreover, a fixed balance signal may also not be able to compensate for changes in signal strength that can occur as a consequence of changes in amplification of the signals received by and transmitted to the terminal device. These changes can occur because the transmission equipment that processes the signals, for example, a radiotelephone base station, may automatically readjust the signal amplification because of changes in external parameters such as background noise. In either situation, the originally established balance signal may not be sufficient to prevent the development of a sidetone signal so large that it interferes with the transmitted signal to the point that the desired signal becomes undecipherable.

SUMMARY OF THE INVENTION

This invention relates generally to a hybrid circuit capable of automatically adjusting, or equalizing, the portion of the receive signal that is feedback to the transmit path, or lines, so as to eliminate reflected sidetone signal. More particularly, this invention is directed to an autoequalizing hybrid that cyclically injects a sample signal into the receive transmission lines, measures the portions of the sample signal returned on the transmit lines and in response to the measured tone, adjusts the balance network. The autoequalizing hybrid of this invention initially adjusts the impedance of the balance network when the circuit is first established, and thereafter, as required. After the initial impedance adjustment, the hybrid monitors the transmit lines for a sidetone signal based on a supervisory signal continuously injected into the receive lines. Changes in the monitored supervisory sidetone signal are recognized as an indication that the balance network impedance is no longer properly set and, in response, the hybrid readjusts the balance network impedance.

The hybrid circuit of this invention includes a balance network with an adjustable impedance. A tone generator injects signals, tones, into the receive path of the hybrid and a detect circuit measures the level of the sidetones that appear on the hybrid transmit path. A microprocessor sets the impedance established by the balance network in response to the sidetone measurements made by the detect circuit.

When a circuit employing the hybrid of this invention is first activated, a set of equalization signals is applied to the receive lines. The microprocessor establishes the impedance level of the balance network with reference to the impedance levels that are required to eliminate the equalization signal sidetones. After the balance network impedance level is set, a supervisory tone is injected into the receive lines. The detect circuit monitors the transmit lines for abrupt changes in the supervisory signal sidetone that appears on the transmit lines. Abrupt changes are an indication that the circuit impedance level has changed and that the balance network may no longer be applying a balancing signal of appropriate strength. In response to a detected abrupt change in supervisory sidetone signal level, the microprocessor directs the tone generator to again apply the equalization signal so that the impedance of the balance network can be properly reset.

In a preferred embodiment of the invention, the balance network impedance is set in response to the output signal from a phase detector. The monitoring, or supervision, is performed by a window comparator that monitors the transmit lines for abrupt changes in the supervisory sidetone.

The autoequalizing hybrid circuit of the invention initially sets the balance network impedance when the circuit is first activated to essentially eliminate reflected sidetone signal. The hybrid circuit then automatically readjusts the balance network as required to prevent the development of sidetone signal that could otherwise develop if the line impedance of the circuit with which the hybrid is used shifts. Thus, the hybrid circuit of this invention is especially well suited to function as a two-to-four wire interface in radiotelephones and other devices that have shifting line impedance. For example, the hybrid circuit of this invention can function as a two-to-four wire interface between a transceiver at a remote location and the telephone equipment connected to the transceiver. The hybrid automatically sets the balancing circuit impedance when the connection to a base station is first established. The hybrid then readjusts the balancing circuit impedance in response to changes in line impedance caused when different telephone extensions with different impedances are activated and deactivated in the course of a conversation. Sidetone signals are thus prevented from developing whenever a different telephone extension is put in use.

BRIEF DESCRIPTION OF THE DRAWINGS

The invention will be pointed out with particularity in the appended claims. The above and further advantages of the invention may be better understood by reference to the following detailed description, taken in conjunction with the accompanying drawings, in which:

DETAILED DESCRIPTION OF THE INVENTION

Figure 1:
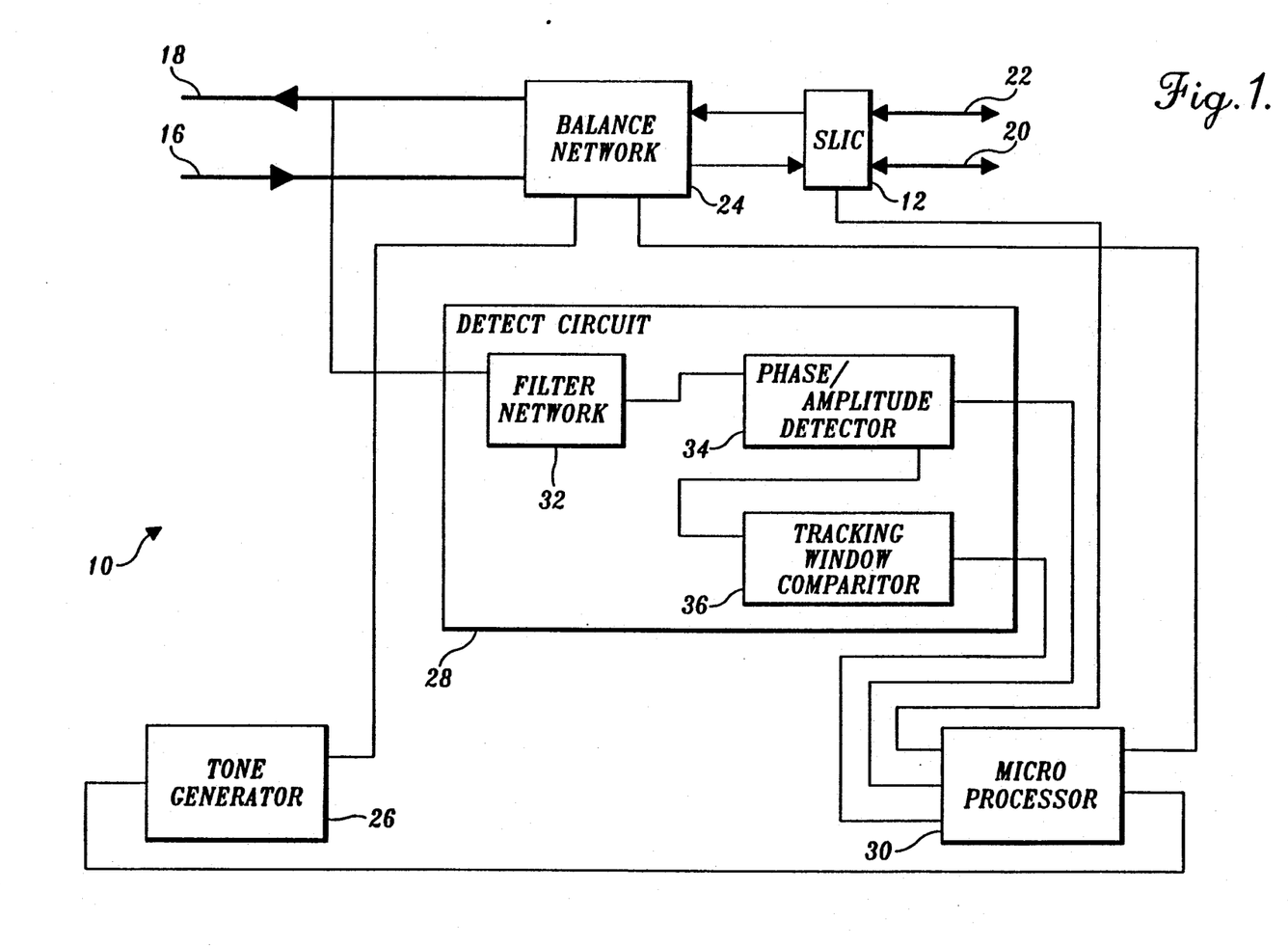
FIG. 1 is a block diagram depicting the basic components of the autoequalizing hybrid of this invention.

FIG. 1 depicts in block diagram an autoequalizing hybrid 10 of this invention including a subscriber loop interface circuit (SLIC) 12 for connecting a four-wire communications path to a two-wire communications path. The four-wire communications path includes a two-wire communications path 16 over which signals are received by the hybrid 10 and SLIC 12, and a two-wire communications path 18 over which signals are transmitted from the hybrid and the SLIC. The SLIC 12 combines the signals from the two unidirectional paths 16 and 18 of the four-wire path so that they can be transmitted and received over a bidirectional two-wire path comprising a tip line 20 and a ring line 22 connected to the SLIC.

The hybrid circuit 10 includes a balance network 24 over which a portion of the receive path 16 signal is fed back to the transmit path 18 to cancel any sidetone signal that is reflected by the SLIC 12 from the receive path 16. The balance network 24 has an adjustable impedance that is controlled by a microprocessor 30. A tone generator 26 injects tones into the receive line 16 and a detect circuit 28 measures the reflected portions of the injected tones that appear as sidetones on the transmit line 18. The microprocessor 30 monitors the measurements made by the detect circuit 28 and in response, sets and rests the impedance level of the balance network 24 to minimize the sidetone signal that is emitted by the hybrid 10.

When the hybrid circuit 10 is first activated, the tone generator 26 injects a set of equalization tones into the receive path 16. The microprocessor 30 monitors the measurements made by the detect circuit 28 and, in response, sets, or equalizes, the balance network 24 feedback so as to minimize the level of the returned signal. After equalization, the tone generator generates a supervisory tone into the receive path 16. The detect circuit 28 and microprocessor 30 monitor, or supervise, the performance of the balance network 24. When the detect circuit 28 indicates an abrupt change in the level of the reflected supervisory sidetone, the microprocessor 30 reequalizes the balance network 24.

The detect circuit 28 includes a filter network 32 for extracting the sidetones from the transmit path 18. The extracted sidetones are supplied to a phase/amplitude detector 34. During the equalization process, the phase/amplitude detector 34 produces a balance signal that indicates when the impedance for the equalization tones have been properly set. When the detect circuit 28 is used to supervise the performance of the balance network 24, the phase/amplitude detector 34 produces an amplitude signal indicative of the level of the returned supervisory sidetone. The amplitude signal is supplied to a tracking window comparator 36 that is sensitive to abrupt changes in the amplitude signal. Whenever an abrupt change in the amplitude signal is detected, the tracking window comparator 36 produces a recalibration signal. The microprocessor 30 responds to the recalibration signal by reequalizing the balance network 24.

Figure 2A:
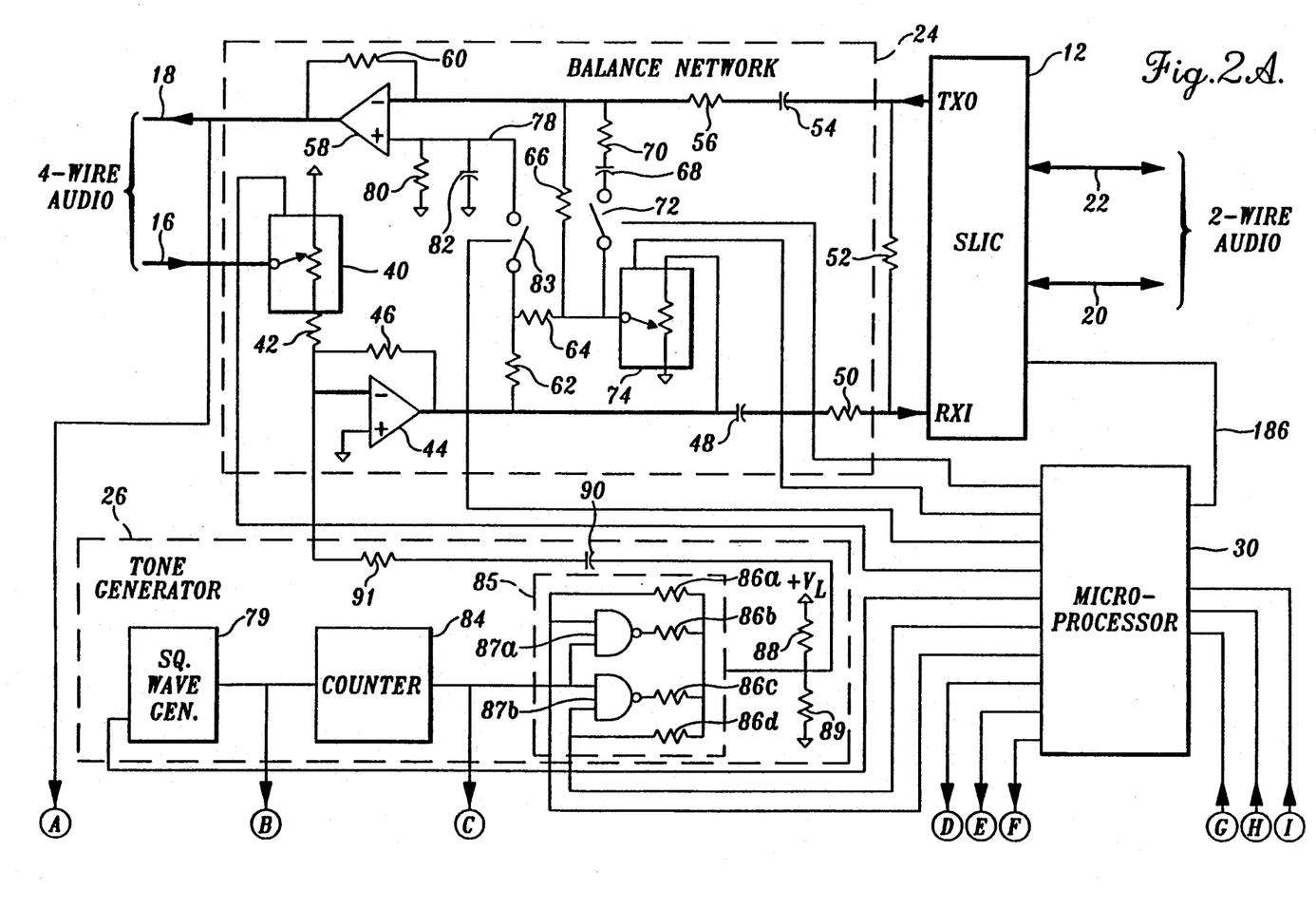
FIGS. 2A and 2B are schematic diagrams depicting in detail the components represented in FIG. 1.
Figure 2B:
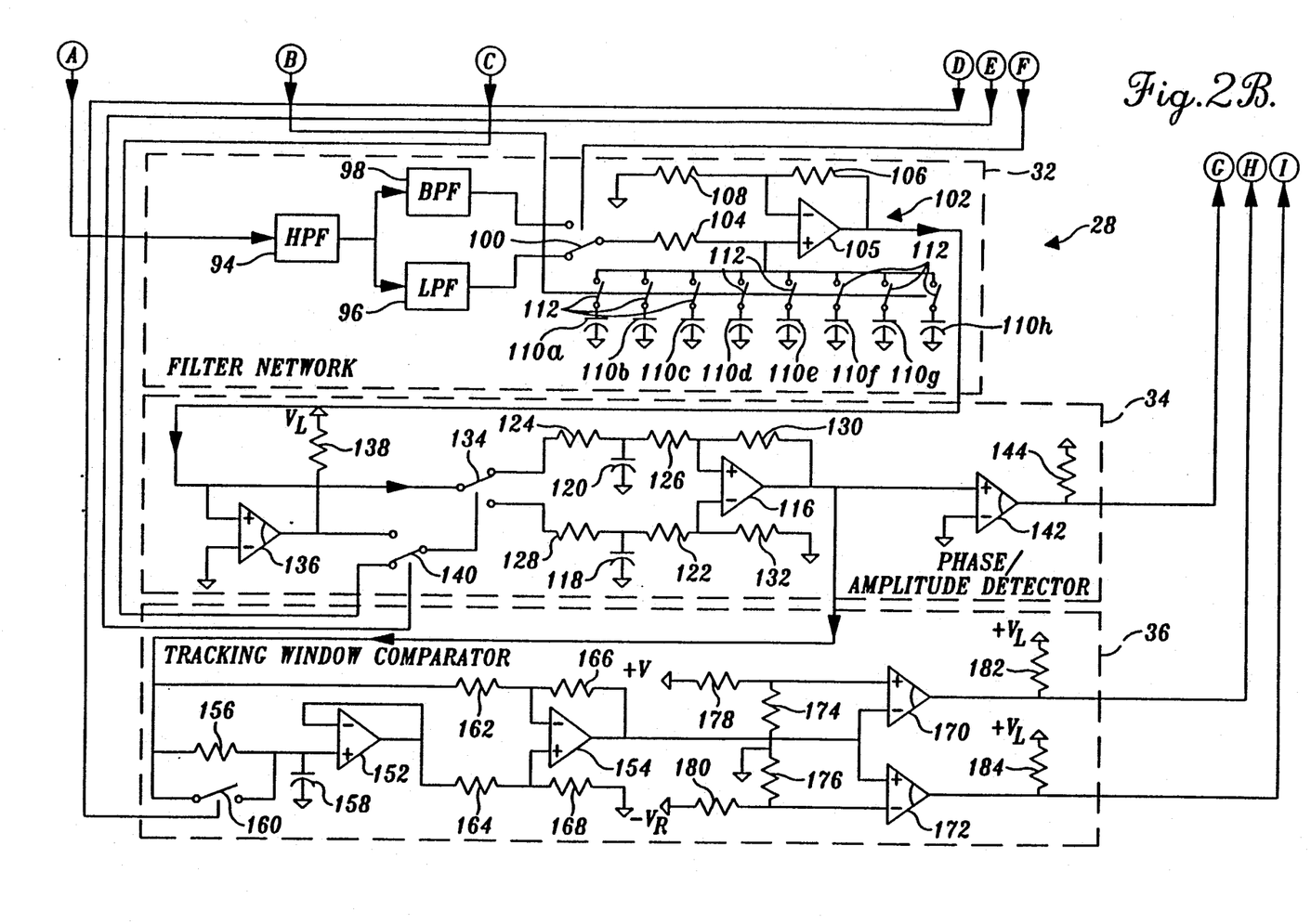

The schematic diagrams of FIGS. 2A and 2B illustrate the hybrid circuit 10 of this invention in detail. The balance network 24 includes a processor-controlled potentiometer 40 for controlling the level of the signals that are received from the receive path 16. The selectivity attenuated receive signals are applied through a resistor 42 and through the inverting input of an amplifier 44 that functions as a feedback amplifier in combination with resistor 46. The output signals from the amplifier 44 are applied through a series-connected capacitor 48 and a load resistor 50 to a receive input, $R_{XI}$, of the SLIC 12. A resistor 52 is tied across the receive input and transmit output, $T_{XO}$, of the SLIC 12 to provide a termination impedance across the SLIC. Output signals from the SLIC 12 are applied from the transmit output to a capacitor 54 and a resistor 56. Resistor 56 is connected to the inverting input of an amplifier 58. Amplifier 58, in combination with feedback resistor 60, provides the output signal that is emitted over the transmit path 18.

The balance network 24 has three cancelation paths through which balancing signals from the receive path 16 are applied to the transmit path 18. A primary path consists of resistor 66 and a processor controlled potentiometer 74. Resistor 66 is connected at one end to the wiper of potentiometer 74 and to the output of amplifier 44 through series connected resistors 62 and 64. The other end of the primary cancelation path, the other end of resistor 66, is connected to the inverting input of amplifier 58. A second cancelation path provides a balance signal to compensate for excess high-frequency sidetone. The second, high-frequency cancelation path consists of a series-connected capacitor 68 and resistor 70 that are selectively tied across resistor 66 by a processor-controlled switch 72. The signals developed across primary and high frequency cancelation paths are 180° out of phase with the sidetone signal. These signals are applied to the inverting input of amplifier 58, the same input the transmit signal from the SLIC 12 is applied to, in order to cancel out the middle and high frequency components (above approximately 200 Hz) of the sidetone signal.

The third cancelation path is a low-frequency cancelation path comprised of a conductor 78 selectively tied between the junction of resistors 62 and 64 and the non-inverting input of amplifier 58. The low-frequency cancelation path further includes a resistor 80 and a capacitor 82 both tied between conductor 78 and ground. The low-frequency path is selectively tied between the junction of resistors 62 and 64 by a processor-controlled switch 83. The signals developed across the low-frequency cancelation path are applied to the non-inverting input of amplifier 58 because they are in phase with the low-frequency components (below approximately 200 Hz) of the reflected sidetone signals. When the low-frequency cancelation path is enabled, amplifier 58 functions as a low-frequency differential amplifier that cancels out the low-frequency components of the sidetone signal with in-phase low-frequency balancing signals. The level of the cancelling signal which is applied through the balance network 24 is set by the processor-controlled potentiometer 74 which which forms voltage divider that is driven by the output signal of amplifier 44 and is tied to ground.

Tone generator 26 includes a processor-controlled square wave generator 79 capable of producing signals between 1 and 100 KHz. The output signals from the square wave generator 79 are applied to a counter 84 that produces output signals having a frequency of one-eighth the input signals. The output signals from the counter 84 are applied to a processor-controlled level selector 85 that establishes the voltage of the signals emitted by the tone generator 26. In the illustrated embodiment of the invention, the level selector 85 comprises a set of resistors 86a, b, c and d and a pair of NAND gates 87a and b connected to form a processor-controlled step-level attenuator capable of emitting an output signal at three non-zero voltage levels. Two control signals are produced by the microprocessor 30 to control the output signal voltage level. In a preferred embodiment of the invention, a level selector 85 need only to be capable of emitting signals at two non-zero voltage levels.

A pull-up resistor 88 is connected between the signal generator level selector 85 output and a positive voltage source—for example, a logic-level source, $V_L$. A pull-down resistor 89 is tied between the level selector 85 output and ground. Resistors 88 and 89 establish a voltage divider to reduce the output amplitude from the level selector 85. The output signal from the level selector 85 is applied to DC blocking capacitor 90. Capacitor 90 prevents DC voltages, which can be heard as a popping sound, from being applied to the balance network 24 and the SLIC 12. The signal is then applied to the inverting input of amplifier 44 through a resistor 91.

As illustrated in FIG. 2B, the detect circuit filter network 32 includes a high-pass filter 94 connected to receive the output signal from the four-wire transmit path 18. The high-pass filter 94 rejects low-frequency signals that result from fluctuation in loop current. In a preferred embodiment of the invention, the cutoff frequency for high-pass filter 94 is applied to both a low-pass filter 96 and a band pass filter 98. The low-pass filter attenuates high-frequency interference that may be present during the equalization process due to microphone background noise, or voice signals that may be present during equalization. In a preferred embodiment of the invention, low-pass filter 96 has a cutoff frequency of approximately 3000 Hz.

Band pass filter 98 attenuates signals, other than the returned portion of the supervisory signals, that may be present during the supervision process. The band pass filter 98 primarily prevents voice and/or data signals on the four-wire transmit path 18 from interfering with the monitoring of the supervisory signal. The band pass filter 98 is centered on the supervisory signal frequency which is above the normal range of signal a human can hear. In a preferred embodiment of the invention, the supervisory sidetone and band pass filter are centered on 18 KHz. Also, in a preferred embodiment of the invention, filters 94, 96 and 98 are each active filters formed from operational amplifiers and appropriately connected resistors and capacitors (not illustrated).

A processor-controlled switch 100 applies the output of either the low-pass filter 96 or the band pass filter 98 to a commutative capacitor filter 102. The commutative capacitor filter 102 includes a resistor 104 and an amplifier 105 series-connected to switch 100. The resistor 104 is connected to the non-inverting input of the amplifier 105. A resistor 104 is connected to the non-inverting input of the amplifier 105. A resistor 106 provides a feedback loop between the output of the amplifier 105 and the inverting input, and a resistor 108 is tied between the inverting input and ground. Commutative capacitor filter 102 also includes a set of eight identical capacitors 110a, b, c . . . and h that are selectively connected between the amplifier 105 non-inverting input and ground. An analog switch 112 ties each capacitor 110 a, b, c, . . . and h, one at a time, between the amplifier 105 and ground. Switch 112 is controlled by the undivided output signal from the square wave generator 79. The square wave generator 79 output signal causes the switch 112 to repetitively tie each capacitor 110a, b, c, . . . h and ground during a specific moment during each cycle of the injected signals. Consequently, the capacitors 110a, b, c, . . . and h integrate the current flow through resistor 104 so that only the injected signals pass through the commutative capacitor filter 102.

The phase/amplitude detector 34 includes an operational amplifier 116 that produces signals representative of phase or amplitude of the reflected portion of the injected signals. The signals from the filter network 32 are applied to the non-inverting input of the operational amplifier 116 through series-connected resistors 128 and 122. A capacitor 118 is connected to ground between resistors 128 and 122. The signals from the filter network 32 are also applied to the inverting input of amplifier 116 through series-connected resistors 124 and 126. A capacitor 120 is tied between resistors 124 and 126 and ground. Resistors 128 and 124 have the same resistance. Capacitors 118 and 120 have identical capacitance. A resistor 130 provides feedback between the output of amplifier 116 and the inverting input. A resistor 132 is tied between the amplifier 116 non-inverting input and ground. Resistors 122 and 132 have the same resistance; resistors 126 and 130 also have the same resistance.

A processor-controlled switch 134 toggles the application of the filtered sidetone signals to the inputs of amplifier 116. The switch 134 is tied at one end to output of the communicating capacitor filter 102 and at the other end to either resistor 128 or resistor 124. When the hybrid 10 is operated in the equalization mode, switch 134 is set by the divided clock signal from the counter 84 so that it toggles in synchronization with the sidetone signal. When the hybrid 10 is operated in the supervisory mode, switch 134 is set by a sidetone zero crossing signal produced by a comparator 136. The inverting input of the comparator 136 is connected to receive the sidetone signal from the commutative capacitor filter 102, and a pull up resistor 138 is tied between the output of the comparator 136 and the logic-level voltage source. A processor-controlled switch 140 connects the blade control elements of switch 134 to either the output of counter 84 or the output of the comparator 136.

The output signal of amplifier 116 is applied to the non-inverting input on comparator 142 to produce a signal indicative of hybrid balance. A pull-up resistor 144 is tied between the output of comparator 142 and the logic level voltage source. The comparator 142 and resistor 144 produce a balance signal that is applied to the microprocessor 30. The balance signal is monitored by the microprocessor 30 to determine the impedance setting of the balance network 24 during the equalization process.

The output signals from amplifier 116 are also applied to the tracking window comparator 36. These signals represent the amplitude of the supervisory signals that have been injected into the receive path 16 and been reflected out through the transmit path 18. The tracking window comparator 36 includes an amplifier 152 for producing a reference signal representative of the average reflected supervisory signal level and an amplifier 154 for comparing the instantaneous reflected sidetone signal level to the reference signal. Output signals from amplifier 116 are applied to the amplifier 152 through a resistor 156 tied to the non-inverting input of the amplifier 152. Resistor 156 has a relatively high resistance, for example, in a preferred embodiment, approximately 1M ohms. A capacitor 158 is tied between the non-inverting input of amplifier 154 and ground. A processor-controlled switch 160 is tied across resistor 156 so that capacitor 158 can be charged to an average reflected sidetone signal level at the start of the supervision process. The output and inverting input of amplifier 152 are tied together so that the amplifier functions as a unity gain buffer amplifier that produces the reference sidetone amplitude signal.

Output signals from amplifier phase/amplitude detector amplifier 116 are also applied to the inverting input of amplifier 154 through a resistor 162. The reference signal from amplifier 152 is applied to the non-inverting input of the amplifier 154 through a resistor 164. A feedback resistor 166 is tied between the output of amplifier 154 and the inverting input. A resistor 168 is tied between the non-inverting input of amplifier 154 and ground. Resistors 162 and 164 have the same resistance, as do resistors 166 and 168 so that amplifier 154 functions as a differential amplifier that produces a supervisory sidetone tracking signal representative of the difference between the instantaneous reflected sidetone signals and the reference signal.

The supervisory sidetone tracking amplitude signal is applied to a pair of comparators 170 and 172, respectively, that produce recalibration signals whenever the supervisory tone tracking signal indicates there has been an abrupt change in the level of the sidetone amplitude signal. The sidetone tracking signal is applied to the inverting input of comparator 170 and the non-inverting input of comparator 172. A pair of series-connected identical resistors 174 and 176 are tied between the non-inverting input of comparator 170 and the inverting input of comparator 172. A resistor 178 is connected between the non-inverting input of comparator 170 and a positive reference voltage, $+V_r$. A resistor 180, identical to resistor 178, is tied between the inverting input and a voltage $-V_r$, which is opposite in magnitude to the positive reference voltage. Resistors 174 and 178 and resistors 176 and 180 form voltage dividers that respectively produce positive and negative voltages that define the acceptable upper and lower limits for the supervisory sidetone tracking signal. In a preferred embodiment of the invention, resistors 174–180 are selected so that the voltage levels can be established by using positive and negative logic level voltage sources as the reference voltage sources. A pull-up resistor 182 is tied between the output of comparator 170 and the logic level voltage source, and a pull-up resistor 184 is tied between the output of comparator 172 and the logic level voltage source. Whenever the sidetone tracking signal exceeds the upper limit signal, the comparator 170 produces a recal high signal. Whenever the sidetone tracking signal falls below the lower limit voltage, comparator 172 produces a recal low signal. The state of the recal high and recal low signals are both monitored by the microprocessor 30.

Microprocessor 30 is a conventional 8-bit microprocessor. A suitable microprocessor 30 is the 80C31 manufactured by Intel. In FIGS. 2A and 2B, the signal input lines and the control output lines are shown as all being directly connected to the microprocessor 30. In a preferred embodiment of the invention, the microprocessor data signal input lines and control output lines are each connected to latches that are selectively tied to a data bus connected to input/output ports on the microprocessor 30. In one preferred embodiment of the invention, a single latch is used to store the input data signals received by the microprocessor 30; two latches are used to store the control signals produced by the microprocessor.

Also shown in FIG. 2A is a conductor 186 over which a hybrid enable signal from the SLIC 12 to the microprocessor 30 travels. The hybrid enable signal is the signal to the hybrid 10 that the circuit to which it is connected has been activated and that it should start the first equalization process. In a preferred embodiment of the invention, the enable signal is a hook status signal produced by the SLIC 12 and received by the microprocssor 30. The hook status connector indicates the on/off hook status of the terminal device connected to the SLIC 12. In other words, the hook status signal indicates whether or not the terminal device has been actuated. Whenever the terminal device is off hook, or actuated, the SLIC 12 produces an off hook signal. When the off hook signal is initially produced, the microprocessor 30 directs the other components of the hybrid 10 to perform the first equalization.

Hybrid equalization is performed by injecting equalization signals into the four-wire receive path 16, determining the impedance needed to cancel the reflected sidetone components of the injected signals and, based on the impedances required for the individual signals, establishing a final impedance for balance network 24. In one preferred embodiment of the invention, three sidetone signals at 500 hz, 1,000 Hz and 2,000 Hz are injected into the receive path 16 in order to determine the appropriate balance network impedance level. The balance network 24 impedance required to cancel each of the injected sidetone signals is determined by adjusting potentiometer 74 until the detect circuit 28 indicates that the affected sidetone on the transmit path 18, instead of decreasing, starts to increase. In other words, the detect circuit 28 produces the balance signal whenever the sidetone level passes through a minimum, or null, level.

The balancing of an equalization signal starts with the microprocessor 30 directing the square wave generator 79 to produce the desired signal. The signal produced by the square wave generator 79 is eight times the desired signal since the signal is subsequently divided by the counter 84 to produce the desired signal. Microprocessor 30 sets switch 100 so that the output of the low pass filter 96 is applied to the commutative capacitor filter 102 and so that the reflected equalization signal is extracted from the transmit path 18 by the filter network 32. The filtered equalization signal is then applied to the phase/amplitude detector 34.

The phase/amplitude detector 34 is operated as a phase detector to produce a signal indicating when, as a result of sidetone passing through the null point, the phase of the measured sidetone shifts. Microprocessor 30 sets switch 140 so that the square wave produced by counter 84, which is at the equalization signal frequency, is used to toggle switch 134. Since switch 134 is toggled synchronously with the equalization signal, opposite polarity charges accumulate on capacitors 118 and 120. As balance network potentiometer 74 is cycled by the microprocessor 30, the reflected equalization signal passes through the null point and undergoes a phase reversal. The phase reversal causes capacitors 118 and 120 to reverse charge and the signal produced by amplifier 116 to likewise change polarity. Amplifier 142, which functions as a comparator, in response to the change in polarity of this output signal from amplifier 116, produces the balance signal to indicate that the impedance of the balance network 24 just crossed the impedance level that minimized the level of the returned, unwanted sidetone.

Figure 3:
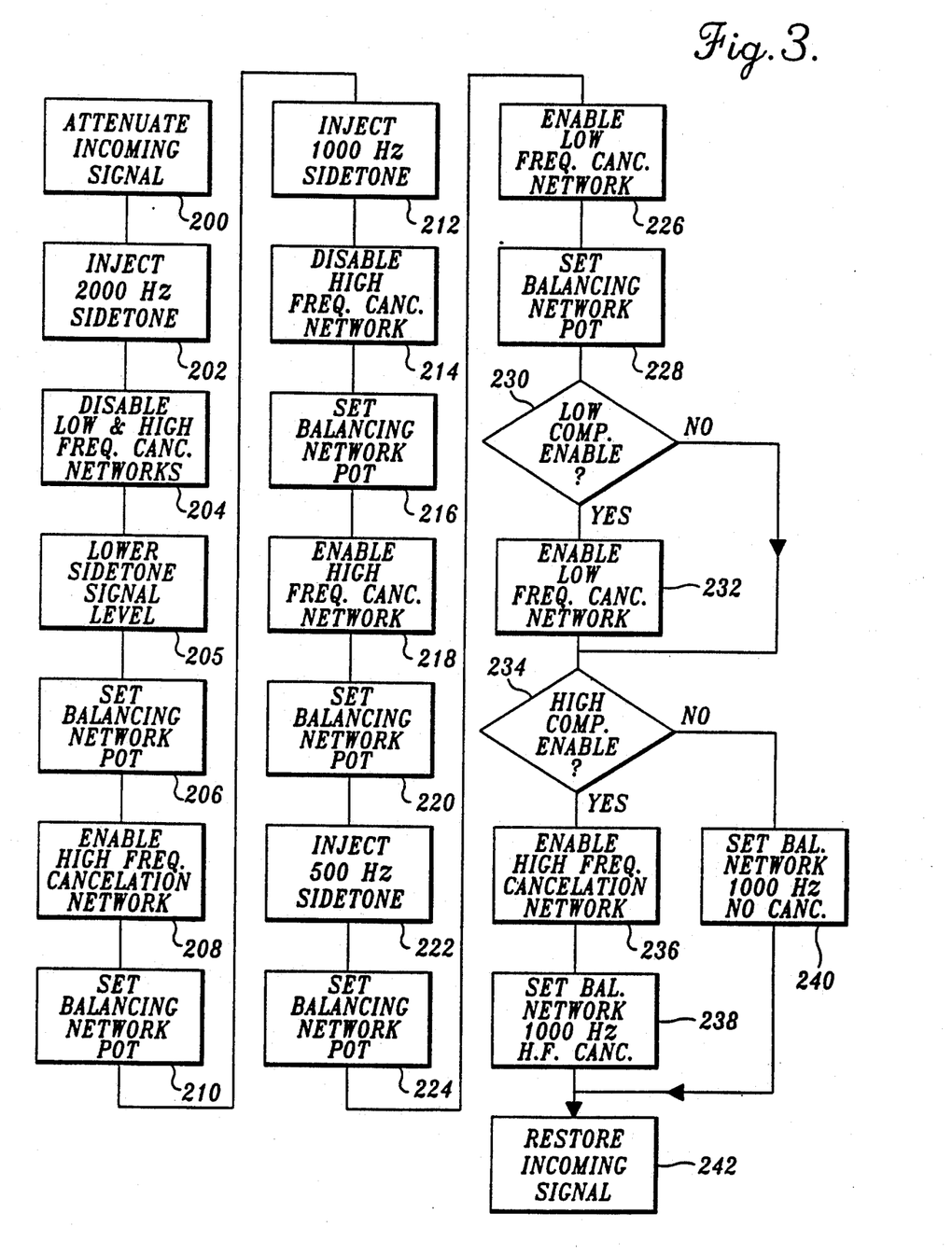
FIG. 3 is a flow chart representing the steps of the equalization process performed by the autoequalizing hybrid of this invention.

The equalization of the balance network 24 by the sequential injection of different equalization signals is explained in detail with reference to the flow chart of FIG. 3. The equalization process starts with the microprocessor 30 setting potentiometer 40 so that the incoming signal received over the receive path 16 is reduced by a factor of 16 as represented by step 300. The incoming signals on the receive path are attenuated so that they do not distort the equalization signals that are injected into the receive path 16. After the incoming signal level has been attenuated, the 2,000 Hz sidetone is injected into a receive path 16 as represented by step 202. At this stage of the equalization process, the signal generator level selector 8 is set so that the high voltage level sidetone is injected into the receive path. This is done to rapidly saturate the elements forming the balance network 24 so that the equalization process can occur in a minimal amount of time. The microprocessor 30 then disables the low-frequency and high-frequency compensating networks in a step 204 by opening switches 72 and 83.

After the high-voltage level sidetone signals have saturated the balance network 24, the signal generator level selector 85 is reset in a step 205 so that a lower voltage level equalization signal is injected into the receive path. The lower level sidetone signal is used to establish the null during the equalization process because it is less audible to the listener. Thus, prior to each balancing step of the equalization process, the level selector 85 is first set to allow the emission of a higher level voltage signal in order to saturate the balance network 24. After saturation, the level selector 85 is reset so that the less audible lower level signal is emitted. For purposes of simplicity, the subsequent resetting of the tone generator level selector 85 is neither described nor illustrated.

After the equalization signal level is set, microprocessor 30 adjusts the impedance of the balance network 24 to minimize the reflected equalization signal as represented by balance step 206. The balance step 206 is performed by the microprocssor 30 adjusting the balance network potentiometer 74 until the phase/amplitude detector 34 produces the balancing signal which indicates that the reflected equalization signal null point has been passed. During the last part of the balancing step 206 and each subsequent balancing step, the microprocessor 30 stores the wiper setting for the balance network potentiometer 74.

The microprocessor 30 then enables the high-frequency cancelation network in a step 208 by closing the balance network switch 72. A balancing step 210 is then performed wherein the microprocssor again adjusts potentiometer 74 to reestablish the sidetone null point for the balance network 24.

Microprocessor 30 then directs the tone generator 26 to produce the 1,000 Hz equalization signal as represented by step 212. The balance network switch 72 is then opened to disable the high-frequency cancelation network in a step 214. A balancing step 216 is then executed to reset the balance network 24 impedance. The high-frequency cancelation network is then reenabled in a step 218 by the closing of the balance network switch 72. A balancing step 220 is then executed to rest the impedance of the balance network 24.

The microprocessor 30 then directs the tone generator 26 to produce a 500 Hz sidetone in a step 222. A balancing step 224 is then executed to reset the impedance of the balance network 24. Note that when the 500 Hz signal is produced, balance network switch 72 remains closed so that the high-frequency cancelation network remains enabled. The low-frequency composition network is next enabled in a step 226 by the closing of the balance network switch 83. A final balancing step 228 is then performed wherein the sidetone is adjusted with respect to the 500 Hz sidetone signal and both the low-frequency and high-frequency cancelling networks enabled.

After the balancing steps have been executed, the potentiometer 74 wiper settings are reviewed to control the enablement of the low-frequency and high-frequency cancelling networks and the setting of the balance network potentiometer 74. Initially, a low-frequency cancelling network enablement test 230 is executed to determine whether or not the frequency cancelation network should be enabled. This determination is made by comparing the effectiveness of the balance network, as measured by the potentiometer 74 setting, in response to the application of different sidetones. The low-frequency cancelation network is enabled if:

$$|E_{500\ HF\ CANC} - E_{1,000\ HF\ CANC}| \geq |E_{500\ HF+LF\ CANC} - E_{1000\ HF\ CANC}|$$

where: $E_{500\ HF\ CANC}$ is the balance network potentiometer 74 setting when the 500 Hz sidetone is injected into the receive path 16 and only the high-frequency cancelation network is enabled, $E_{500\ HF+LF\ CANC}$ is the balance network potentiometer 74 setting for the 500 Hz sidetone signal when both the high-frequency and low-frequency cancelation networks are enabled, and $E_{1,000\ HF\ CANC}$ is the balance network potentiometer 74 setting when the 1,000 Hz sidetone is injected and the high-frequency cancelation network is enabled. If the low-frequency cancelation network is to be enabled, microprocessor 30 performs a network enablement step 232 wherein switch 83 is closed to enable the low-frequency cancelation network.

Microprocessor 30 then determines whether or not the high-frequency cancelation network should be enabled in a test 234. A microprocessor 30 determines whether or not the high-frequency cancelation network should be enabled by comparing the relative potentiometer 74 settings with and without the network enabled. The high frequency cancelation and network is enabled if:

$$|E_{2000\ NOCANC} - E_{1,000\ NO\ CANC}| \geq |E_{2000\ HF\ CANC} - E_{1000\ HF\ CANC}|$$

where: $E_{2000\ NO\ CANC}$ is the potentiometer setting when the 2000 Hz sidetone signal is injected and the high-frequency cancelation network is disabled, $E_{1000\ NO\ CANC}$ is the balance potentiometer setting when the 1,000 Hz sidetone is injected and the high-frequency cancelation network is disabled, and $E_{2000HF\ CANC}$ is the balance potentiometer setting when the 2000 Hz sidetone is injected and the high-frequency cancelation network is enabled. If the high-frequency cancelation network is to be enabled, microprocessor 30 closes the balance network switch 72 in a step 236 so as to enable the high-frequency cancelation network.

The setting of the balance network 24 impedance concludes with the resetting of the balance network potentiometer 74. The final setting of potentiometer 74 is dependent on whether or not the high-frequency cancelation network is enabled as determined by test 234. If the high-frequency cancelation network is enabled, the microprocessor 30 sets the balance network potentiometer 74 to the 1000 Hz high-frequency cancelation network enabled balance setting adjusted for an overshoot factor as represented by step 238. If the high-frequency cancelation network is not enabled, the balance network potentiometer 74 is rest to the 1000 Hz cancelation network disabled balanced potentiometer setting adjusted for the overshoot factor as represented by step 240. The overshoot factor compensates for the time lag between when the equalization sidetone passes through the null signal level until the time that the phase/amplitude detector 34 asserts a balance signal and the microprocessor 30 reads the balance network potentiometer 74 wiper setting.

The last step in the equalization process is the restoration of the incoming signal over the four-wire receive path 16 as represented by step 242. In the restoration step 242, the microprocessor 30 resets potentiometer 40 so the full-strength signal is applied to receive sidetone components of the balance network 24.

After the hybrid 10 is equalized, the microprocessor 30 supervises the performance of the balance network 24. The microprocessor 30 directs the tone generator 26 to produce a high-frequency, inaudible supervisory signal that is injected into the receive path 16. The tone generator level selector 85 is set so that the supervisory signal is produced at the second, or low level, signal strength. Microprocessor 30 sets switch 100 so that the output of band pass filter 98 is applied to the commutative capacitor filter 102. The filter network 32 thus extracts the reflected supervisory tone component from the four-wire transmit path 18. During the supervision process, switch 140 ties the output of comparator 136 to switch 134 so that the comparator toggles the switch 134. The signal produced by comparator 136 toggles the switch 134 in synchronization with the zero crossing of the sidetone signal. Opposite polarity voltages build up in proportion to the amplitude of the tone on phase/amplitude detector capacitors 118 and 120. Amplifier 116 consequently produces an output signal proportional to the amplitude of the reflected supervisory signal.

The supervisory signal amplitude signal produced by the phase/amplitude detector 34 is applied to the tracking window comparator 36. At the start of the supervision process, microprocessor 30 momentarily closes switch 160 across resistor 156 to allow capacitor 158 to charge to the full level of the supervisory amplitude signal. Once switch 160 is open, amplifier 152 functions as a buffer amplifier that produces the reference sidetone amplitude signal.

The sidetone amplitude signal from the phase/amplitude detector 34 is also applied to amplifier 154 that functions as a differential amplifier. As long as the instantaneous sidetone amplitude signal approximates the reference sidetone amplitude signal, amplifier 154 will produce a supervisory sidetone tracking signal having a relatively low absolute voltage level. If changes in line impedance cause a substantial increase in the level of the reflected signal, the level of the supervisory sidetone tracking signal will similarly change. Any abrupt changes in the supervisory sidetone will cause an abrupt change in the instantaneous sidetone amplitude signal. Amplifier 154 will, in turn, produce a supervisory sidetone tracking signal having a relatively high absolute voltage level. When the magnitude of the supervisory sidetone tracking signal passes the established upper or lower limits, comparator 170 or 172 will produce an appropriate recal signal. In response to the receipt of a recal signal, microprocessor 30 will then reequalize the balance network 24 so as to minimize the level of signal that is reflected from the four-wire receive path 16 to the transmit path 18.

The autoequalizing hybrid 10 of this invention initially adjust the impedance of the balance network 24 and monitors the performance of the network and, if necessary, readjusts the balance network impedance to ensure the reflected receive signal component of the four-wire transmit signal is as small as possible. The hybrid 10 initially equalizes the balance network 24 when the terminal device to which the hybrid connected is first activated. The hybrid 10 then continues to monitor, or supervise, the performance of the balance network 24 to determine whether or not the network continues to provide a cancelling signal that is sufficient to minimize the reflected sidetone. Should line impedances or other factors cause an increase in the reflected receive signal, as measured by a change in the reflected supervisory signal, the balance network 24 of the hybrid 10 is reequalized to minimize the reflected signal. For example, should line impedance change because one terminal device is deactivated in favor of another device, as happens when different telephones are placed on and off hook, the hybrid will reequalize the balance network to compensate for the change. In other words, the hybrid 10 will prevent a sidetone singing signal from developing whenever one telephone extension is deactivated in favor of another extension.

Moreover, just as this hybrid 10 can adjust for telephone extensions being placed on and off hook, it can adjust for the connection and disconnection of different terminal devices to the associated four-wire transmission equipment. The hybrid 10 will automatically adjust the balance network to compensate for a change in impedance whenever one terminal device, for example a facsimile machine, is substituted for another terminal device, for example a computer modem. The hybrid 10 will also adjust the balance network to compensate for changes in incoming signal strength that may occur occur as consequence of changes in the signal being emitted by the radiotelephone base station linked to the remote terminal. The autoequalizing hybrid 10 of this invention is thus well-suited to serve as an interface between standard two-wire telecommunications terminal equipment and a radio that links the terminal equipment to a conventional telecommunications network.

Another advantage of the hybrid 10 of this invention is that during the equalization process the high-frequency equalization signal is the first signal injected into the receive path 16. This signal serves as an indication to persons communicating over the hybrid 10 that the balance network 24 is reequalizing. Upon hearing the signal, the persons will momentarily stop speaking so that low-frequency components of their speech do not distort the low-frequency equalization signals injected into the receive path 16 as part of the equalization process.

Moreover, the audio hybrid 10 of this invention determines the sidetone signal null level impedance for a particular equalization tone based on the phase reversal of the sidetone. Since the phase reversal occurs at the exact point the sidetone reaches the null level, this detection systems offers a precise indication of when the null level is reached.

The foregoing description has been limited to a specific embodiment of this invention. It will be apparent, however, from the description of the invention, that it can be practiced using alternative components other than what have been specifically described. For example, the disclosed components forming the balance network 24, the tone generator 26, and the detect circuit 28 are readily understood to be exemplary and not limiting. Moreover, it is further understood that the disclosed process by which the microprocessor 30 establishes the balance network 24 impedance similarly is illustrative and not limiting. For example, in the disclosed embodiment of the invention, when either the recal high or recal low supervisory signal is produced, the same reequalization is performed. In other embodiment so the invention, different reequalization processes may be executed depending upon whether it is the recal high or recal low signal that is received by the microprocessor 30. Furthermore, it is similarly understood that the disclosed comparisons used to determine whether the high and low frequency cancelation paths should be enable and the potentiometer 74 setting are similarly only exemplary. In other embodiments of the invention, the potentiometer 74 settings, the equalization sidetone signal null level impedances, which form the components of the comparison equations, may differ greatly from what has been disclosed.

Therefore, it is an object of the appended claims to cover all such modifications and variations as come within the true spirit and scope of the invention.

The embodiments of the invention in which an exclusive property or privilege is claimed are defined as follows:

1. A hybrid circuit for separating incoming signals on a receive path from outgoing signals on a transmit path, including:
    a balance network having an adjustable impedance connected between the receive path and the transmit path;
    a tone generator connected to the receive path for selectively injecting at least one equalization signal and a supervisory signal into the receive path;
    a detect circuit connected to the transmit path for receiving reflected sidetone signals produced as a consequence of said signals being injected into said receive path said detect circuit producing a balance signal when a measured equalization signal sidetone is at approximately a null level, said detect circuit producing a recalibration signal when a measured supervisory sidetone signal level has an abrupt change in magnitude; and
    processor means that is connected to said balance network for controlling the adjustable impedance of said balance network impedance, that is connected to said tone generator for controlling the injection of said equalization and supervisory signals, and that is connected to said detect circuit for receiving said balance signal and said recalibration signal, said processor means equalizing an impedance of said balance network by directing said tone generator to inject said at least one equalization tone into the receive path, changing the impedance of said balance network adjustable impedance, and in response to receiving said balance signal, setting said balance network impedance, said processor means further directing said tone generating to inject said supervisory signal into said receive path and in response to receiving and recalibrate signal, reequalizing said balance network impedance.

2. The hybrid circuit of claim 1 wherein:

said balance network includes a variable resistor for controlling said balance network impedance; and said processor means, when equalizing said balance network, adjusts said balance network variable resistor to obtain an equalization sidetone null impedance level, and then resets said balance network variable resistor to set said balance network impedance based on said equalization sidetone null impedance level.

3. The hybrid circuit of claim 1 wherein said balance network includes a primary impedance path connected between the receive path and the transmit path and a high-frequency cancelation network selectively connected between the receive path and the transmit path; and said processor means selectively connects said high-frequency cancelation network between the receive path and the transmit path to set said balance network impedance.

4. The hybrid circuit of claim 1 wherein:

said balance network includes a primary cancelation network connected between the receive path and the transmit path and a low-frequency cancelation network selectively connected between the receive path and the transmit path; and said processor means selectively connects said low-frequency cancelation network between the receive path and the transmit path when setting said balance network impedance.

5. The hybrid circuit of claim 3 wherein:

said balance network includes a primary cancelation network connected between the receive path and the transmit path and a low-frequency cancelation network selectively connected between the receive path and the transmit path; and said processor means selectively connects said low-frequency cancelation network between the receive path and the transmit path when setting said balance network impedance.

6. The hybrid circuit of claim 2 wherein:

said balance network includes a primary impedance path connected between the receive path and the transmit path, a high-frequency cancelation path selectively connected between the receive path and the transmit path, and a low-frequency cancelation path selectively connected between the receive path and the transmit path; and said processor means selectively connects said high-frequency cancelation path and said low-frequency cancelation path between the receive path and the transmit path when setting said balance network impedance.

7. The hybrid circuit of claim 6 wherein during said balance network impedance equalization, said processor means applies said at least one equalization signal to the receive path when said high-frequency and said low-frequency cancelation networks are disconnected from said transmit path, obtains a first equalization sidetone null impedance level, selectively connects one of said high frequency and low-frequency cancelation paths to said transmit path, obtains a second equalization sidetone null impedance level, and sets said balance network impedance based on said equalization sidetone null impedance levels.

8. The hybrid circuit of claim 6 wherein said balance network includes a differential amplifier in series with the transmit path; and wherein said transmit path, said primary impedance path, and said high frequency cancelation path are all connected to a first input of said differential amplifier having a polarity, and said low frequency cancelation path is tied to a second input of said differential amplifier having a polarity opposite the polarity of said first input.

9. The hybrid circuit of claim 1 wherein:

said tone generator selectively generates at least two equalization signals having different frequencies; and said processor means equalizes said balance network impedance by directing said tone generator to sequentially inject said at least two equalization signals into the receive path, changing said balance network impedance to determine an equalization sidetone null impedance level for each said at least two equalization sidetone signals, and setting said balance network impedance based on said equalization sidetone null impedance levels.

10. The hybrid circuit of claim 9 wherein said tone generator is capable of generating three equalization signals having different frequencies.

11. The hybrid circuit of claim 9 wherein:

said tone generator further includes a signal level selector for controlling voltage levels of said at least two equalization signals so that said at least two equalization signals are injected into the receive path at a first signal level and at a second signal level, said second signal level being lower than said first signal level; and said processor means is connected to said signal level selector and directs said tone generator to initially inject each said at least two equalization signals into said receive path at said first level, and prior to adjusting said balance network impedance to obtain said equalization sidetone null impedance levels, directs said tone generator to inject said equalization signals at said second signal level.

12. The hybrid circuit of claim 6 wherein:

said tone generator selectively generates at least two equalization signals having different frequencies and further includes a signal level selector for controlling the voltage levels of said at least two equalization signals so that said at least two equalization signals are injected into the receive path at a first signal level and at a second signal level, said second signal level being lower than said first signal level; and said processor means equalizes said balance network impedance by directing said tone generator to sequentially inject said at least two equalization signals into the receive path, changing said balance network impedance to determine equalization sidetone null impedance levels for each of said at least equalization signals, and setting said balance network impedance based on said equalization sidetone null impedance levels and is connected to said tone generator for controlling the signal level selector and directs said tone generator to initially inject each of said at least two equalization signals into said receive path at said first level, and prior to adjusting said balance network impedance to determine said equalization sidetone null impedance levels, directs said tone generator to inject said at least two equalization signals at said second signal level.

13. The hybrid circuit of claim 12 wherein during said balance network impedance equalization said processor means applies at least one said equalization signal to the receive path when said high-frequency and said low-frequency cancelation networks are disconnected from said transmit path, obtains a first equalization sidetone null impedance level, selectively connects one of said high frequency and low-frequency cancelation paths to said transmit path, obtains a second equalization sidetone null impedance level for the aforesaid equalization signal, and sets said balance network impedance based on said equalization sidetone null impedance levels.

14. The hybrid circuit of claim 12 wherein said balance network includes a differential amplifier in series with the transmit path; and wherein said transmit path, said primary impedance path, and said high frequency cancelation are all connected to a first input of said differential amplifier having a polarity, and said low frequency cancelation path is tied to a second input of said differential amplifier having a polarity opposite the polarity of said first input.

15. The hybrid circuit of claim 1 wherein said at least one equalization signal and said supervisory signal are at different frequencies and said supervisory signal is above the normal range of aurally detectable signals.

16. The hybrid circuit of claim 1 wherein said detect circuit includes a filter circuit connected to said transmit path for extracting said equalization and supervisory sidetone signals, a phase and amplitude detector for receiving all extracted sidetone signals and for producing said balance signal and a supervisory sidetone amplitude signal, and a tracking window comparator connected to said phase and amplitude detector for receiving said supervisory sidetone amplitude signal and in response thereto, producing said recalibration signal.

17. The hybrid circuit of claim 16 wherein:
said filter network includes a first filter for extracting signals containing said equalization sidetone signal, a second filter for extracting signals containing said supervisory sidetone signal, a third filter for filtering non-sidetone signals from said extracted signals, and a filter switch for selectively connecting one of said first filter and said second filter to said third filter; and
said processor means is connected to and controls said filter switch.

18. The hybrid circuit of claim 16 wherein said tracking window comparator includes a buffer amplifier connected to receive said supervisory sidetone amplitude signal and produce a reference sidetone amplitude signal, a differential amplifier connected to receive said supervisory sidetone amplitude signal and said reference sidetone amplitude signal and in response thereto, producing a tracking signal, and at least one level comparator connected to receive said tracking signal and produce said recalibration signal whenever said tracking signal exceeds a selected level.

19. A method of equalizing the impedance of a hybrid circuit having a balance network and having an adjustable impedance connected between a receive path and a transmit path including the steps of:
injecting equalization signals into the receive path and changing a balance network impedance;
measuring equalization sidetone signals that appear on the transmit path as a consequence of said equalization signals being injected into the receive path and determining a balance network impedance when said equalization sidetone signals are approximately at a null level;
setting the balance network impedance;
injecting supervisory signals into the receive path;
monitoring supervisory sidetone signals that appear on the transmit path as a consequence of said supervisory signals being injected into the receive path; and
when a select supervisory sidetone signal characteristic is detected, reequalizing the balance network impedance.

20. The method of equalizing the impedance of a hybrid circuit of claim 19, wherein said balance network has a primary cancelation path and a selectively enabled low-frequency cancelation path, including the steps of:
injecting said equalization signals into the receive path and determining a first equalization sidetone null signal impedance when the low-frequency cancelation path is disabled;
injecting said equalization signals into the receive path and determining a second balance network equalization sidetone null signal impedance when the low-frequency cancelation path is enabled; and
setting the balance network impedance based on said first and second equalization sidetone null signal impedances.

21. The method of equalizing the impedance of a hybrid circuit of claim 19, wherein said balance network has a primary cancelation path and a selectively enabled high-frequency cancelation path, including the steps of:
injecting said equalization signals into the receive path and determining a first equalization sidetone null signal impedance when the high-frequency cancelation path is disabled;
injecting said equalization signals into the receive path and determining a second balance network equalization sidetone null signal impedance level when the high-frequency cancelation path is enabled; and
setting the balance network impedance based on said first and second equalization sidetone null signal impedances.

22. The method of equalizing the impedance of a hybrid circuit of claim 19, further including the steps of:
injecting a first equalization signal into the receive path;
determining a first equalization sidetone null signal impedance;
injecting a second equalization signal having a different frequency than said first equalization signal into the receive path;
determining a second equalization sidetone null signal impedance; and setting the balance network impedance based on said first and second equalization sidetone null signal impedances.

23. The method of equalizing the impedance of a hybrid circuit of claim 19, wherein the balance network has a primary cancelation path, a selectively enabled high-frequency cancelation path and a selectively enabled low-frequency cancelation path, further including the steps of:
   injecting a first equalization signal into the receive path;
   determining a first equalization sidetone null signal impedance when the high-frequency cancelation path is disabled and a second balance network equalization sidetone null signal impedance when the high-frequency cancelation path is enabled;
   injecting a second equalization signal having a different frequency than said first equalization signal into the receive path;
   determining a third equalization sidetone null signal impedance when the low-frequency cancelation path is disabled and a fourth equalization sidetone null signal impedance when the low-frequency cancelation path is enabled; and
   setting the balance network impedance based on said first, second, third, and fourth equalization sidetone null signal impedances.

24. The method of equalizing the impedance of a hybrid circuit of claim 23, wherein the high-frequency cancelation path is enabled when determining said third and fourth equalization sidetone null signal impedances.

25. The method of equalizing the impedance of a hybrid circuit of claim 19, further including the steps of initially applying said first and second equalization signals at a first signal level and, prior to determining said equalization sidetone null signal impedances, applying said equalization signals at a second level having a lower magnitude than said first signal level.

26. The method of equalizing the impedance of a hybrid circuit of claim 23, further including the steps of initially applying each said equalization signal at a first signal level and, prior to determining each said equalization sidetone null signal impedance, applying said equalization signal at a second level having a lower magnitude than said first signal level.

27. The method of equalizing the impedance of a hybrid circuit of claim 19, wherein said equalization signals and said supervisory signals are at different frequencies and said supervisory signals are above the range of aurally detectable signals.

28. The method of equalizing the impedance of a hybrid circuit of claim 19, wherein the select supervisory sidetone signal characteristic comprises an abrupt change in magnitude of said supervisory sidetone signals.

29. The method of equalizing the impedance of a hybrid circuit of claim 28, wherein the abrupt change in magnitude of said supervisory sidetone signal is determined by:
   initially establishing a reference supervisory sidetone signal level; and
   comparing an instantaneous supervisory sidetone signal level with said reference signal.

30. A hybrid circuit for separating incoming signals on a receive path from outgoing signals on a transmit path, including:
   a balance network having an adjustable impedance and a variable resistor connected between the receive path and the transmit path;
   a tone generator connected to the receive path for selectively injecting equalization tones into the receive path;
   a detect circuit connected to the transmit path for receiving reflected sidetone signals produced as a consequence of said equalization tones being injected into said receive path, said detect circuit producing a balance signal when said measured equalization signal sidetone is approximately at a null level; and
   processor means that is connected to said balance network for controlling said balance network impedance and said variable resistor, that is connected to said tone generator for controlling the injection of said equalization tones, and that is connected to said detect circuit for receiving said balance signal, said processor means equalizing said balance network impedance by directing said tone generator to inject a first equalization tone into the receive path, adjusting said variable resistor until said balance signal is produced to obtain a first equalization sidetone null impedance level, said first equalization sidetone null impedance level forming at least part of a first impedance component, injecting a second equalization tone into the receive path, adjusting said variable resistor until said balance signal is produced to obtain a second equalization sidetone null impedance level, said second equalization sidetone null impedance level forming at least part of a second impedance component, comparing said first and second impedance components, and based on said comparison, setting said balance network impedance.

31. The hybrid circuit of claim 30 wherein:
said balance network includes a primary impedance path connected between the receive path and the transmit path and a high-frequency cancelation network selectively connected between the receive path and the transmit path; and
said processor means selectively connects said high-frequency cancelation network between the receive path and the transmit path and said processor means directs said tone generator to produce said first and second equalization tones at a single frequency, obtains said first equalization sidetone null impedance level when said high-frequency cancelation network is disconnected, obtains said second equalization sidetone null impedance level when said high-frequency cancelation network is connected, and selectively connects said high-frequency cancelation network to set said balance network impedance.

32. The hybrid circuit of claim 31 wherein:
said tone generator is capable of producing said equalization tones having at least two different frequencies; and
said processor means directs said tone generator to inject a first tone having a first frequency to obtain said first and second equalization sidetone null impedance levels, directs said tone generator to inject a second tone having a second frequency different than said first frequency to obtain a third equalization sidetone null impedance level when said high-frequency cancelation network is disconnected and a fourth equalization sidetone null impedance level when said high-frequency network is disconnected, forms said first impedance component from said first and third equalization sidetone null impedance levels, and forms said second and impedance component from said second and fourth equalization sidetone null impedance levels.

33. The hybrid circuit of claim 30 wherein:
said tone generator is capable of producing said equalization tones having at least two frequencies;
said processor means directs said tone generator to inject said first and second equalization tones at different frequencies.

34. The hybrid circuit of claim 30 wherein:
said balance network includes a primary impedance path connected between the receive path and the transmit path and a low-frequency cancelation network selectively connected between the receive path and the transmit path; and
said processor means selectively connects said low-frequency cancelation network between the receive path and the transmit path and said processor directs said tone generator to produce said first and second equalization tones at a single frequency, obtains said first equalization sidetone null impedance level when said low-frequency cancelation network is disconnected, obtains said second equalization sidetone null impedance level when said low-frequency cancel network is connected, and selectively connects said low-frequency cancelation network to set said balance network impedance.

35. The hybrid circuit of claim 31 wherein:
said tone generator capable of producing said equalization tones having at least two frequencies; and
said processor means directs said tone generator to inject a first tone having a first frequency, and obtains said first and second equalization sidetone null impedance levels, directs said tone generator to inject a second tone having a second frequency different than said first frequency and obtains a third equalization sidetone null impedance level, forms said first impedance component from said first and third equalization sidetone null impedance levels, and forms said second impedance component from said second and third equalization sidetone null impedance levels.

36. A method of equalizing an impedance of a hybrid circuit imcluding a balance network having an adjustable impedance connected between a receive path and a transmit path comprising the steps of:
injecting a first equalization tone into the receive path, adjusting the balance network impedance and measuring equalization sidetones that appear on the transmit path to obtain a first equalization sidetone null impedance level forming at least part of a first impedance component;
injecting a second equalization tone into the receive path, adjusting the balance network impedance and measuring equalization sidetones that appear on the transmit path to obtain a second equalization sidetone null impedance level different from said first equalization sidetone null impedance level forming at least part of a second impedance component;
comparing said first and second impedance components; and
setting the balance network impedance based on the comparison.

37. The method of equalizing the impedance of a hybrid circuit of claim 36 wherein said first and second equalization tomes are at different frequencies.

38. The method of equalizing the impedance of a hybrid circuit of claim 36 wherein said balance network has a primary cancelation path and a selectively enabled high-frequency cancelation path, including the steps of:
injecting said first equalization tone into the receive path when the high-frequency cancelation network is disabled; and
injecting said second equalization tone into the receive path when the high-frequency cancelation network is enabled.

39. The method of equalizing the impedance of a hybrid circuit of claim 38 wherein said first and second equalization tones are at different frequencies, further including the steps of:
injecting a third equalization tone having the same frequency as said first equalization tone into the receive path when the high-frequency cancelation network is enabled to obtain a third equalization sidetone null impedance level;
injecting a fourth equalization tone having the same frequency as said second equalization tone into the receive path when the high-frequency cancelation network is disabled to obtain a fourth equalization sidetone null impedance level;
forming said first impedance component from said first and fourth equalization sidetone null impedance levels; and
forming said second impedance component from said second and third equalization sidetone null impedance levels.

40. The method of equalizing the impedance of a hybrid circuit of claim 36 wherein said balance network has a primary cancelation path and a selectively enabled low-frequency cancelation path, including the steps of:
injecting said first equalization tone into the receive path when the low-frequency cancelation network is disabled; and
injecting said second equalization tone into the receive path when the low-frequency cancelation network is enabled.

41. The method of equalizing the impedance of a hybrid circuit of claim 40 wherein said first and second equalization tones are at the same frequency, further including the steps of:
injecting a third equalization tone having a frequency different than said first and second equalization tones into the receive path to obtain a third equalization sidetone null impedance level;
forming said first impedance component from said first and third equalization sidetone null impedance levels, and
forming said second impedance component from said second and third equalization sidetone null impedance levels.

* * * * *